A. CAREY.
Cotton-Planter.
No. 27,107. Patented Feb. 14, 1860.
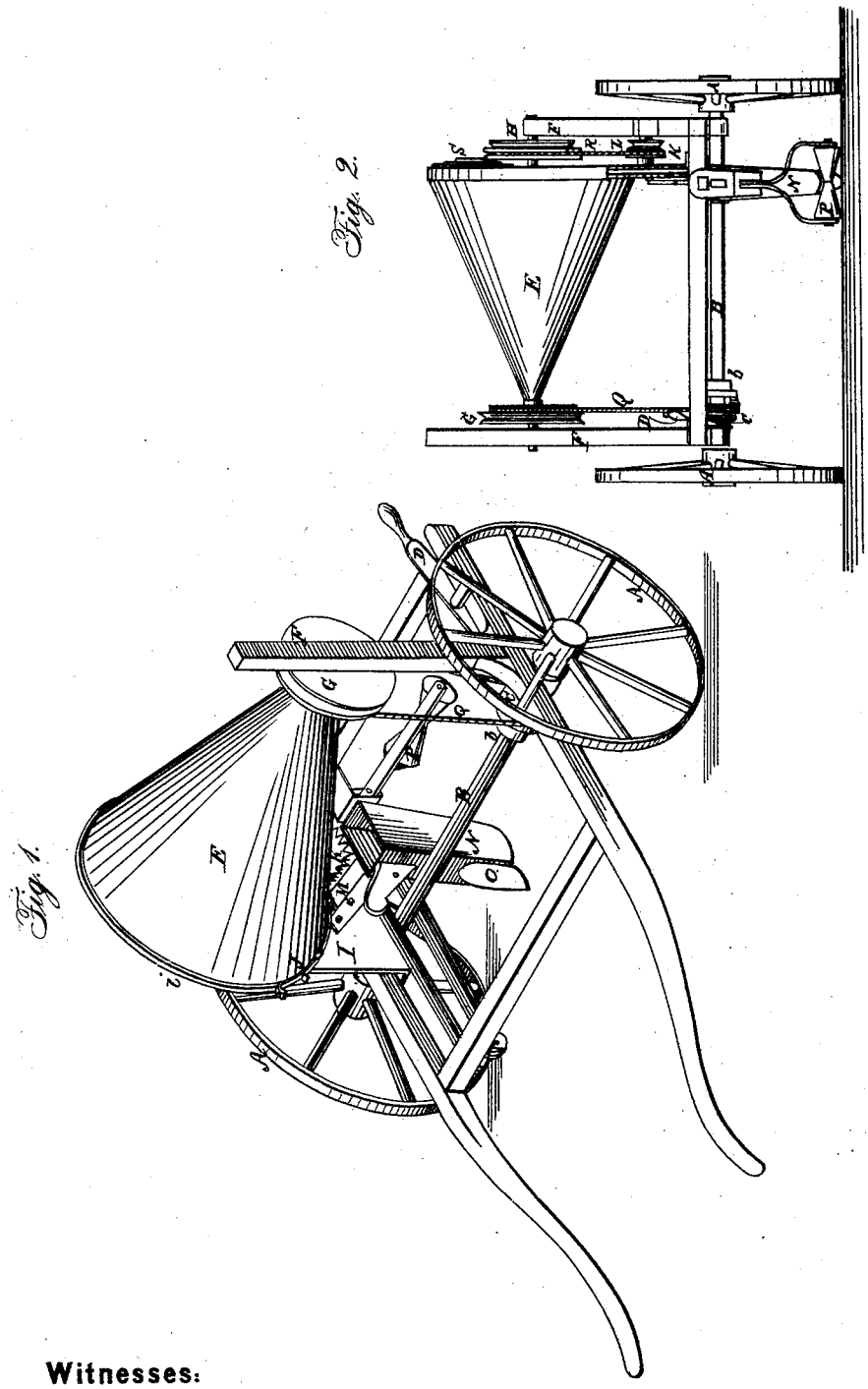
Witnesses:
Geo H Knight
C Sturm Jr
Inventor:
Abner Carey

UNITED STATES PATENT OFFICE.

ABNER CAREY, OF ROME, GEORGIA.

IMPROVEMENT IN COTTEN-SEED PLANTERS.

Specification forming part of Letters Patent No. 27,107, dated February 14, 1860.

*To all whom it may concern:*

Be it known that I, ABNER CAREY, of Rome, in the county of Floyd and State of Georgia, have invented a new and useful Improvement in Cotton-Planters; and I hereby declare the following to be a full and exact description of the same, reference being had to the accompanying drawings, making part of this specification, and in which—

Figure 1 is a perspective view, and Fig. 2 a rear elevation, of the machine.

A are ground-wheels attached to an axle, B, so as to impart rotation to the latter.

C is a clutch-pulley running loosely on the axle B, but adapted to be thrown in gear at will with a clutch-pulley, $b$, rigidly mounted on the said axle.

D is a lever by means of which the pulley $c$ is thrown in and out of gear.

E is a conical hopper journaled horizontally in standards F rising from the main frame of the machine.

G and H are nest score-pulleys attached to the respective ends of the shaft of the hopper E, inside of the journals. The base or larger end of the hopper E is closed by a stationary plate, I, formed with a flange, $i$, within which the said hopper turns. The flange $i$ is omitted for a space on the under side, so as to form, in connection with the periphery of the hopper, a slot or aperture for the discharge of seed, the capacity of which slot may be regulated by a sliding gate, J.

K is a rotary feeder constructed in the form of a duplex circular saw and working in the discharging-slot in a plane parallel with the motion of the hopper E.

L is a pulley attached to the axis of the feeder K.

M is a spout delivering the seed into the tube N, by which it is deposited in the ground.

O is a tooth or scorer attached to the point of the tube N, so as to form the furrows to receive the seed.

P is a covering-roller formed, in the manner exhibited, to cover and ridge up the seed.

Q is a belt passing around the pulleys C and G, so as to impart motion from one to the other.

R is a belt passing around the pulleys H and L for a similar purpose.

S is a gate in the plate I, through which seed is introduced into the hopper.

Operation: The hopper E being supplied with seed and the clutch-pulleys C and $b$ thrown in gear, the machine is drawn forward, the effect of which is to rotate the hopper E and picker K in the same direction, causing their adjacent parts to move in opposite directions, as indicated by the arrows. By this means the seed is taken from the hopper in a continuous and uniform stream, and through the agency of the spout M and tube N deposited in the furrow formed by the tooth O, after which it is immediately covered and the earth compacted sidewise about it by the double conical roller P.

The above-described arrangement is found to effectually overcome the well-known intractable character of cotton-seed in planting and deliver it in a uniform stream of any extent desired, according to the adjustment of the gate J. A common toothed feeder, or one in the form of a single saw, fails to separate the seed with certainty and uniformity, the tenacious quality of the seeds causing them to slip to one side or the other as the teeth come in contact with them.

I claim as new and of my invention herein and desire to secure by Letters Patent—

The combination of the horizontal conical hopper E and duplex saw-shaped feeder K, constructed, arranged, and operating substantially as and for the purposes set forth.

In testimony of which invention I hereunto set my hand.

ABNER CAREY.

Witnesses:
GEO. H. KNIGHT,
C. STEEMER, Jr.